(12) United States Patent
Naderhirn

(10) Patent No.: US 8,467,953 B2
(45) Date of Patent: Jun. 18, 2013

(54) METHOD FOR AUTOMATIC AVOIDANCE OF COLLISIONS BETWEEN A CRAFT AND FURTHER OBJECTS

(76) Inventor: Michael Naderhirn, Linz (AT)

( * ) Notice: Subject to any disclaimer, the term of this patent is extended or adjusted under 35 U.S.C. 154(b) by 120 days.

(21) Appl. No.: 12/733,781

(22) PCT Filed: Sep. 19, 2008

(86) PCT No.: PCT/EP2008/007915
§ 371 (c)(1),
(2), (4) Date: Jun. 30, 2010

(87) PCT Pub. No.: WO2009/040064
PCT Pub. Date: Apr. 2, 2009

(65) Prior Publication Data
US 2011/0213513 A1    Sep. 1, 2011

(30) Foreign Application Priority Data
Sep. 20, 2007    (AT) ................ A 1482/2007

(51) Int. Cl.
*G08G 5/04*    (2006.01)
(52) U.S. Cl.
USPC .......................................................... 701/301
(58) Field of Classification Search
USPC .......................................................... 701/301
See application file for complete search history.

(56) References Cited

U.S. PATENT DOCUMENTS

| | | | |
|---|---|---|---|
| 3,784,800 A * | 1/1974 | Willoteaux ................. | 701/530 |
| 4,839,658 A * | 6/1989 | Kathol et al. ................ | 342/455 |
| 6,097,996 A | 8/2000 | Deker | |
| 6,201,482 B1 | 3/2001 | Schiefele et al. | |
| 6,510,388 B1 * | 1/2003 | Sporrong et al. ............. | 701/301 |
| 6,546,338 B2 | 4/2003 | Sainthuile et al. | |
| 6,785,610 B2 * | 8/2004 | Baker et al. .................. | 701/301 |
| 6,975,246 B1 * | 12/2005 | Trudeau ....................... | 340/903 |
| 7,818,127 B1 * | 10/2010 | Duggan et al. ............... | 701/301 |

(Continued)

FOREIGN PATENT DOCUMENTS

| | | |
|---|---|---|
| DE | 196 09 613 A1 | 9/1997 |
| EP | 0 117 130 A2 | 8/1984 |

(Continued)

OTHER PUBLICATIONS

Eby, Martin, "A Self-Organizational Approach for Resolving Air Traffic Conflicts," The Lincoln Laboratory Journal, vol. 7 No. 2, 1994, pp. 239-254.*

(Continued)

*Primary Examiner* — James Trammell
*Assistant Examiner* — David Testardi
(74) *Attorney, Agent, or Firm* — Muirhead and Saturnelli, LLC

(57) ABSTRACT

A method for controlling the motion of an object for the avoidance of collisions with obstacles includes: detecting of at least one non-stationary or stationary obstacle; defining a safety zone around the obstacle which moves together with the obstacle; detecting whether the obstacle, including its safety zone, is in a collision course with the object; calculating an avoidance trajectory, which by-passes the obstacle, such that the avoidance trajectory, at least approximately, is circularly shaped and that the circularly-shaped avoidance trajectory, or a straight line tangentially linked thereto, is tangent to the safety zone around the obstacle; and driving the object such that it follows, at least approximately, the calculated avoidance trajectory, whereby the calculated avoidance trajectory is tangentially linked to the previous trajectory.

14 Claims, 5 Drawing Sheets

U.S. PATENT DOCUMENTS

2007/0078600 A1* 4/2007 Fregene et al. ............... 701/301
2008/0027647 A1* 1/2008 Ansell et al. ................. 701/301
2010/0121574 A1* 5/2010 Ariyur et al. ................. 701/301

FOREIGN PATENT DOCUMENTS

| EP | 1 240 636 A1 | | 9/2002 |
| --- | --- | --- | --- |
| EP | 1 287 514 A1 | | 3/2003 |
| EP | 1 329 863 A1 | | 7/2003 |
| EP | 1329863 A1 | * | 7/2003 |
| GB | 2415943 A | * | 1/2006 |
| WO | WO 97/47945 | | 12/1997 |
| WO | WO 2006021813 A1 | * | 3/2006 |

OTHER PUBLICATIONS

Han, Su-Cheol et al., "Proportional Navigation-Based Optimal Collision Avoidance for UAVs," Proc. $2^{nd}$ Intl. Conf. on Autonomous Robots and Agents (ICARA2004), Dec. 13-15, 2004, pp. 76-81.*

Barfield, Finley, "Autonomous collision avoidance—the technical requirements", Proceedings of the IEEE 2000 National Aerospace and Electronics Conference. NAECON 2000. Oct. 10-12, 2000. pp. 808-813.*

Swihart, D.E. et al., "Automatic air collision avoidance system design and development", Air Force Research Laboratory Report AFRL-VP-WP-TP-2003-338, Oct. 2003, 10 pages, downloaded from http://www.dtic.mil/cgi-bin/GeTRDoc?AD=ADA418477.*

Bach, et al., "An Algorithm for Level-Aircraft Conflict Resolution", NASA, Tactical ATM, May 31, 2007.

Galdino, et al., "Formal Verification of an Optimal Air Traffic Conflict Resolution and Recovery Algorithm", $14^{th}$ International Workshop, WOLLIC 2007, Lecture Notes in Computer Science, Springer Berlin/Heidelberg, Bd 4576/2007, Jul. 4, 2007.

Eby, et al., "Free flight separation assurance using distributed algorithms", IEEE Aerospace Conference Proceedings, XX, XX, Bd. 2, Mar. 6, 1999.

Bicchi, et al., "An Optimal Cooperative Conflict Resolution for Air Traffic Management Systems", IEEE Transactions on Intelligent Transporation Systems, vol. 1, No. 4 Dec. 2000.

Grilley, "Resolution Requirements for Passive Sense & Avoid", http://www.uavm.com/images/GRILLEY_.pdf, Jan. 26, 2005.

Pallottino, et al., "Decentralized cooperative policy for conflict resolution in multi-vehicle systems", IEEE Transactions on Robotics and Automation, 2007.

* cited by examiner

METHOD FOR AUTOMATIC AVOIDANCE OF COLLISIONS BETWEEN A CRAFT AND FURTHER OBJECTS

TECHNICAL FIELD

This application relates to a method for automatic avoidance of collisions between a craft and further objects. The method is particularly well-suited for automatically avoiding collisions of unmanned controllable aircrafts with other aircrafts or stationary obstacles.

BACKGROUND OF THE INVENTION

Various systems for collision avoidance are known, in particular systems for avoiding collisions between aircrafts which communicate with each other for this purpose.

There is a need for providing a method for controlling a craft that ensures a reliable avoidance of stationary or moving, and particularly non-cooperative obstacles by the craft within certain boundaries. For the detection of obstacles the on board sensor-system of the craft that has a relatively short sensing range should suffice. The overall costs of the system should be low.

SUMMARY OF THE INVENTION

According to an embodiment of the system described herein, a method for controlling the motion of an object for the avoidance of collisions with obstacles comprises the following: detecting of at least one non-stationary or stationary obstacle; defining a safety zone around the obstacle which moves together with the obstacle; detecting whether the obstacle, including its safety zone, is in a collision course with the object; calculating an avoidance trajectory, which by-passes the obstacle, such that the avoidance trajectory, at least approximately, is circularly shaped and that the circularly-shaped avoidance trajectory, or a straight line tangentially linked thereto, is tangent to the safety zone around the obstacle; and driving the object such that it follows, at least approximately, the calculated avoidance trajectory, whereby the calculated avoidance trajectory is tangentially linked to the previous trajectory.

BRIEF DESCRIPTION OF THE DRAWINGS

The following figures and the further description should help to improve the understanding of the invention. Closer details, modifications, and further developments of the inventive idea will be discussed using figures of selected special cases of the motion of the own flying object and an obstacle. The elements in the figures are not to be understood as limitations, instead the description of the principle of the invention is emphasized. In the figures, same reference symbols denote corresponding parts. In the drawings the own craft is illustrated as sketched aircraft.

DETAILED DESCRIPTION

In the following the craft controlled in accordance with the system described herein is shortly denoted as "own craft". The area in which the own craft can move and in which obstacles can occur is simplifyingly assumed to be a horizontal plain.

In one example of the method in accordance with the invention the following situation is assumed:

It is assumed, that the distance to obstacles is not allowed to fall below a certain minimum distance. Around smaller, local obstacles a circular safety zone can be assumed, in which the own craft is not allowed intrude.

The area in which the own craft may move in the near future and in which obstacles, that require reaction, may occur is monitored by means of an on-board sensor system for continuously detecting a locating possible obstacle.

In case an obstacle is detected, an avoidance trajectory of the own craft that by-passes the obstacle is calculated. This avoidance trajectory is composed of a circular arc and, optionally, a straight segment, wherein the straight segment is tangentially linked to the circular arc and the circular arc is tangentially linked to the trajectory of the own craft before starting the avoidance maneuver. The virtual radius of the circular arc corresponds to a small radius of curvature of the trajectory of the own craft whose upper limit can be guaranteed for the respective velocity.

The own craft will be automatically driven in accordance with the pre-calculated avoidance trajectory at the latest in a last possible moment when otherwise an intrusion of the own craft into the safety zone around a detected obstacle would not be avoidable.

A necessary sensor radius $R_{sense}$ (sensor range) for avoiding an obstacle H as intended is dependent on the velocity of the own craft A and the radius k of the curved segment of the avoidance trajectory of the own craft A in all the considered cases. By means of geometrical considerations and the resulting mathematical approaches the required minimum sensor range may be calculated for the respective cases so as to guarantee a safe avoidance.

Figure 1:
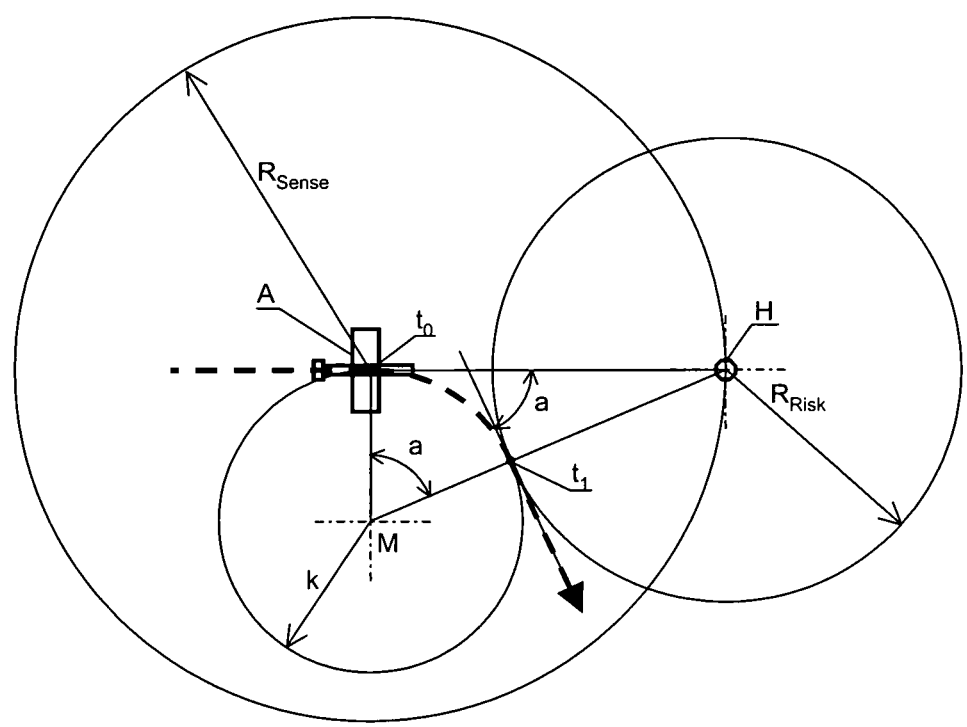
FIG. 1 illustrates the spatial and the motional situation for a stationary obstacle that is regarded as punctiform and which is located ahead of the own craft in the direction of its motion and being detected in the last moment in which a desired avoidance maneuver is still possible.

For the case in accordance to FIG. 1 the sensor radius $R_{sense}$ for an obstacle H situated ahead is:

$$R_{sense} \geq (k+R_{Risk}) \cdot \sin(a), \text{ wherein } a = \arccos(k/(k+R_{Risk}))$$

This formula is tantamount to: $R_{sense} \geq \sqrt{R_{Risk}^2 + 2 \cdot k \cdot R_{Risk}}$ Thereby:

$R_{sense}$ is the range of the sensor of the own craft A, which automatically detects external objects (e.g. obstacle H), $R_{Risk}$ is the radius of the circular safety zone, i.e. the minimum distance to be observed around the obstacle H, which is assumed to be punctiform, and k is the radius of the circular segment assumed for the calculation; in the calculation model the own craft A follows this circular segment in order to deviate from the original trajectory to a trajectory which by-passes the detected obstacle H providing an appropriate minimum distance $R_{Risk}$. In the following this radius is denoted shortly as "avoidance trajectory radius".

Figure 2:
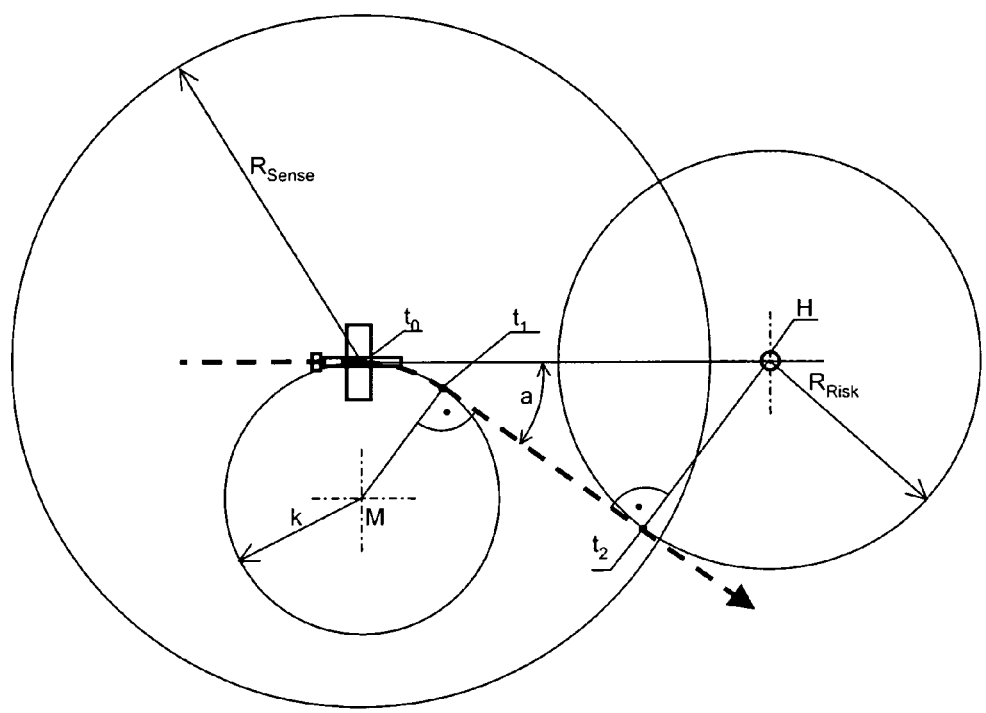
FIG. 2 illustrates the situation as in FIG. 1 with the difference that the obstacle is detected earlier.

In the case in accordance with FIG. 2 the obstacle lying in the trajectory is detected earlier relatively to the own avoidance trajectory radius. This naturally leads to a smaller required angle a throughout which the curved segment of the avoidance trajectory has to extend. In accordance with the avoidance trajectory an arc is flown until the straight line in the direction of the motion (i.e. the tangent to the avoidance trajectory) touches the circle having the safety radius $R_{Risk}$ around the obstacle.

Figure 3:
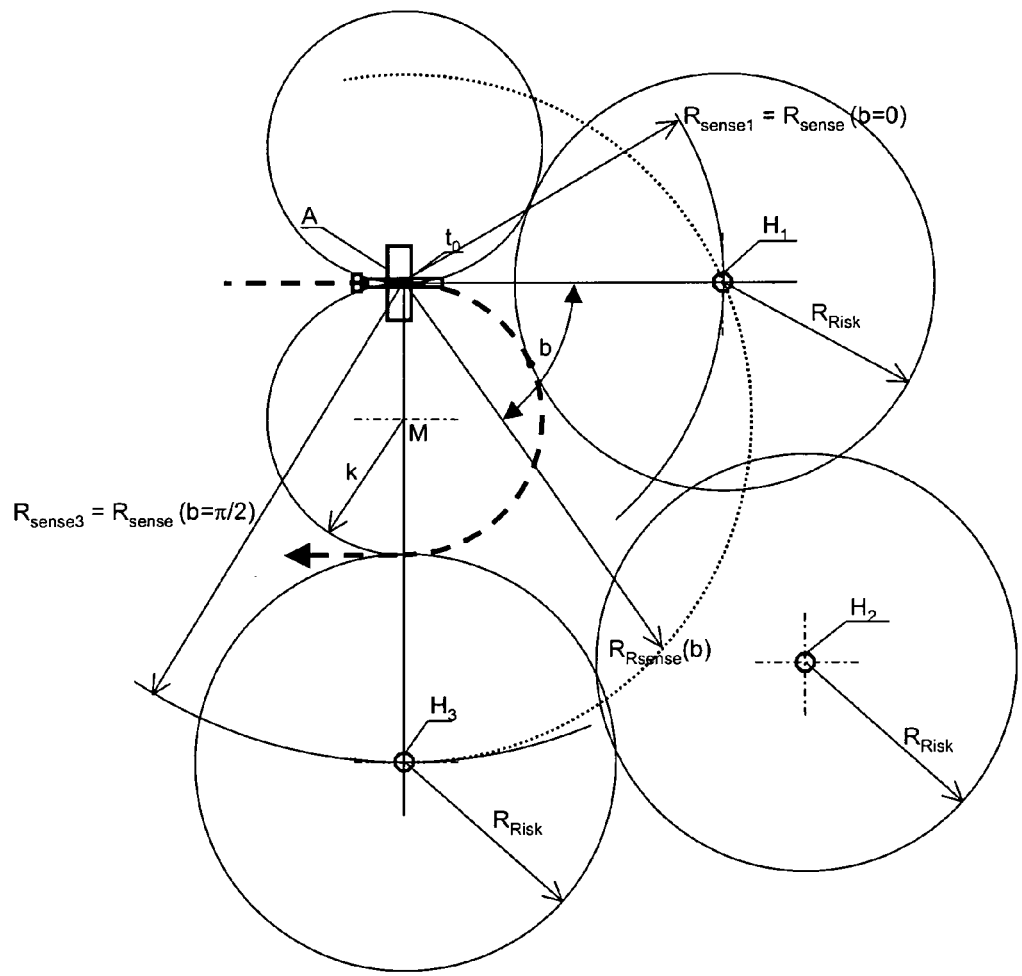
FIG. 3 illustrates the spatial and motional situation for several stationary obstacles.

FIG. 3 illustrates a critical situation with the simultaneous presence of several stationary obstacles $H_1$, $H_2$, and $H_3$. Provided that the own craft A always should be able to avoid an obstacle that lies directly ahead in a rightward direction—which is at least specified by law—, it follows demonstratively that the sensor radius has to be, with respect to a stationary obstacle $H_3$ lying 90° at the right, at least the sum of the minimum distance $R_{RISK}$ and two times the avoidance trajectory radius k of the own trajectory adopted for avoidance ($R_{sense}=R_{Risk}+2k$). The dotted line marks the distance $R_{sense}(b)$ from the own craft A, which depends on the angle b with respect to the direction of motion and in which stationary obstacles have to be detected so as to allow for the intended avoidance. This line is a circular line around the center point M of the circle segment (dashed line) of the own avoidance trajectory.

In accordance with FIG. 3 the angle b indicates the angular deviation between the line connecting the obstacle and the own craft and the direction of motion of the own craft. For example, for the obstacle $H_1$ the angle b equals 0 rad and for the obstacle $H_3$ the angle b equals $\pi/2$ rad (90°). If said connecting line lies on the right of the direction of motion, then b is positive. For this reason the required minimum sensor radius $R_{sense}(b)$ can be calculated dependent on the angle b, the avoidance trajectory radius k and the minimum distance $R_{Risk}$ in accordance with the following equation for stationary obstacles:

$$R_{sense}(b) \geq \sqrt{(R_{Risk}+k)^2 - k^2 \cdot \cos(b)} + k \cdot \sin(b)$$

Figure 4:
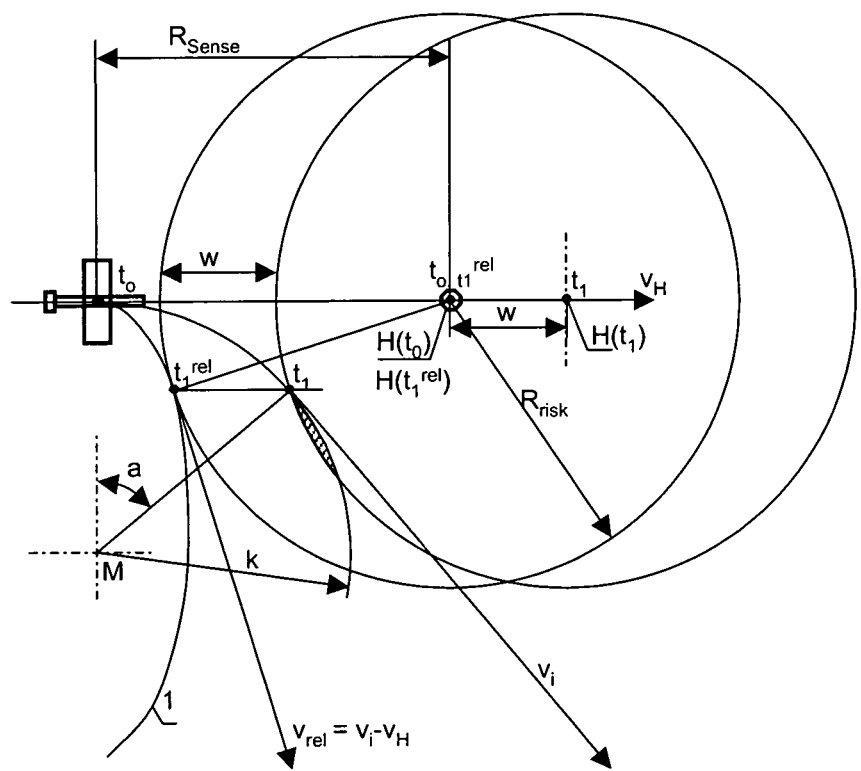
FIG. 4 illustrates the spatial and motional situation when, in the direction of the motion of the own craft, an obstacle is moving in front of the craft with slow velocity in the same direction and when this is detected in the last moment in which a desired avoidance maneuver is still possible.

FIG. 4 illustrates a critical situation of an ideal avoidance maneuver when, in the direction of motion of the own craft A and ahead thereof, an (assumed to be punctiform) external craft (i.e. obstacle H) is moving with a velocity $v_H$ slower than the own craft A and having the same direction, and when this external craft H is detected in the last moment in which the intended avoidance maneuver is still possible.

The trajectory 1 thereby represents the actually circular avoidance trajectory of the own craft A in the relative frame of reference in which the obstacle H stands still. According to this, the actual trajectory of the own craft A is superposed by the reversed motion $v_H$ of the obstacle H which, in the present example, actually is a constant and linear motion. Obstacle H is detected at the time $t_0$. At the time $t_1$ the relative trajectory of avoidance of the own craft A is tangent to the circular safety zone of the obstacle H having the risk radius $R_{Risk}$. Between the times $t_0$ and $t_1$ the obstacle H moves along the linear distance w (from left to right in FIG. 4) and the own craft A moves along a circular arc having the avoidance trajectory radius k throughout the angel a.

The equation system including the required minimum sensor radius $R_{sense}$ for the present case generally does not have a closed-form solution for $R_{sense}$, as it results, after elimination of all other unknowns, in a fourth order polynomial of the unknown variable ($R_{sense}$). Of course it can be solved by data processing, for example by calculating, for the curve 1 as well as for the circular line with the required minimum distance $R_{Risk}$ around the obstacle H, a sequence of pairs of values describing these curves from the normal direction to the original direction of the axis of the own craft and from the direction of the curve, and by extracting these pair of values from the two sequences, at which said normal direction matches said direction. In an ideal avoidance maneuver the two curves are tangent at these values, wherefrom the distance between the own craft A and the obstacle H in the direction of the original axis of motion can be derived and therefrom further the required minimum sensor radius $R_{sense}$.

Figure 5:
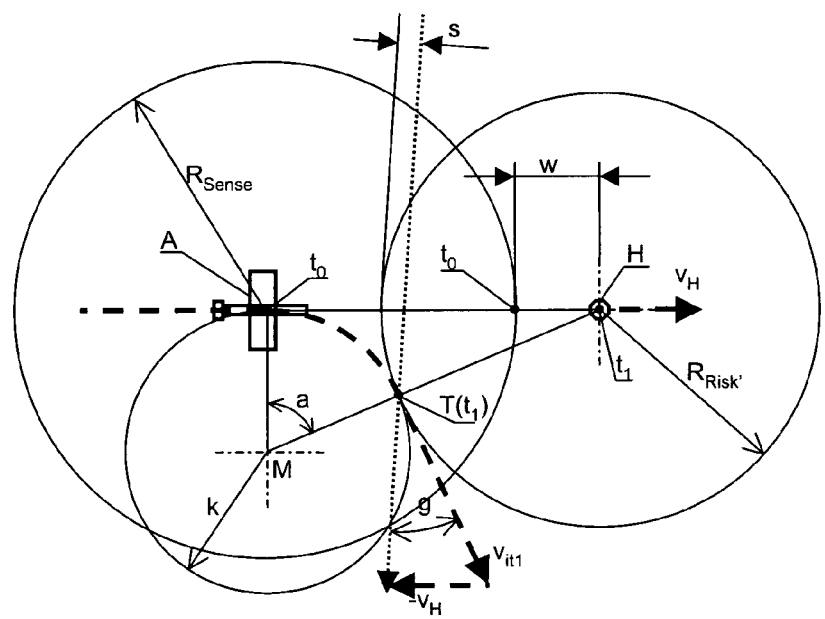
FIG. 5 illustrates the situation of FIG. 4 by means of a simplifying consideration for an approximation.

FIG. 5 illustrates a model, which helps to perform the calculation of the required avoidance maneuver in accordance with FIG. 4 in a more simple manner and with a sufficiently precise approximation. Firstly, the point is calculated in which the own craft A, at the end of the curved avoidance trajectory, would touch the circular safety zone with radius $R_{Risk}$ around the obstacle H in the manner illustrated in FIG. 5 (tangent point $T(t_1)$), if the obstacle H would stand still exactly at the time of tangency. For the respective geometric calculations it is assumed that during the time which the own craft A requires to run through the curved segment of its avoidance trajectory the obstacle H also moves on in a linear manner. The distance between the own craft A and the non-stationary obstacle H at the time $t_0$, i.e. when the original course is left and the avoidance trajectory is adopted, corresponds to, as a first approximation, the required minimum sensor radius $R_{sense}$. For this, the following equation can be derived:

$$R_{sense} = (k + R_{Risk}) \cdot \sin(a) - (v_H/v_i) \cdot k \cdot a \qquad (1)$$

whereby:

$$a = \cos^{-1}(k/R_{Risk}+k).$$

Therein, $v_H$ is the velocity of the obstacle H and $v_i$ the velocity of the own craft.

This equation is only an approximation, as, naturally, the safety zone with radius $R_{Risk}$ moves together with the respective obstacle H. Hence, at the time $t_1$, the own craft is not tangent to the safety zone but it passes through its outer margin. The angular deviation from the tangent direction equals the angular difference g between, on the one hand, the velocity vector of the motion of the own craft at the time $t_1$ and, on the other hand, the velocity vector of the motion of the own craft reduced by the velocity vector $V_H$ of the motion of the obstacle. The value marked s in FIG. 5 indicates how far thereby the own craft intrudes into the safety zone around the obstacle for linear motion or, respectively, how far it has already intruded for a motion of the obstacle in the same direction.

Said angular difference g can be calculated in a simple manner by means of the vectorial scalar product.

$$\cos(g) = \frac{\vec{V}_{it1} \cdot (\vec{V}_{it1} - \vec{V}_H)}{|\vec{V}_{it1}| \cdot |\vec{V}_{it1} - \vec{V}_H|} \text{ and}$$

$$s = R_{Risk} \cdot (1 - \cos(g))$$

whereby:

$$s = R_{Risk} \cdot \left(1 - \frac{\vec{V}_{it1} \cdot (\vec{V}_{it1} - \vec{V}_H)}{|\vec{V}_{it1}| \cdot |\vec{V}_{it1} - \vec{V}_H|}\right) \qquad (2)$$

As with the above equation (1) the approximately correct sensor radius $R_{sense}$ and with equation (2) the corresponding correaction value s can be calculated easily, it is very advantageous in the case of non-stationary obstacles to use the above equation (1) for the calculation of the required minimum sensor range, thereby inserting an safety distance $R_{Risk}'=R_{Risk}+s$ which is, with respect to the actual value, augmented and calculated using equation (2). $v_{it1}$ denotes the velocity $v_i$ of the own craft at the time $t_1$ of tangency of avoidance trajectory and safety zone.

This approximation technique—calculating, on the one hand, a "quasi-stationary tangency of the risk zone" and, on the other hand, "adding the corresponding range of intrusion calculated in accordance with equation (2) to the required minimum safety distance" for the calculation—generally also leads to good results for obstacles which do not move along the original line of movement of the own craft. This approximation technique additionally is congruent with calculation schemes mentioned above for stationary obstacles.

The control of the own craft A in the surrounding of an obstacle H is, of course, not only performed by detecting an obstacle and correspondingly adopting an avoidance trajectory once. In a continuously repeating sequence of steps the area covered by the minimum sensor range $R_{sense}$, which is determined by the own velocity and the possible maximum velocity of potential obstacles, is sensed for obstacles. If an obstacle is detected in such proximity to the predicted own trajectory which is closer than allowed by the safety distance, then an adequate modified trajectory is calculated and adopted. Simultaneously, it is further sensed for obstacles. If the previously located obstacle is determined to have a different velocity or location, then the own trajectory is, again, modified and so on, until the own trajectory by-passes the obstacle providing a sufficiently large distance.

Known methods for warning against and/or for avoiding collisions and the present method have in common, that safety margins have to be included for the time spans accumulating from the intrusion of an obstacle into a distance range of interest, followed by the identification and the position finding by means of the own sensor, the decision about the type of avoidance trajectory, driving and moving the necessary actuators for changing the course of the craft, and so on. Further the present method and known methods have in common that, in applications with crafts floating in space, flying in the atmosphere, or diving under water, additionally to the surveillance of the plane of the own motion more or less the surveillance of proximate parallel planes has to be performed as well as more or less heavily tilted possible planes of motion of further objects, which intersect the own position. In particular, the projection of velocity and position of a detected obstacle into the plane of motion of the own craft can be calculated, and the further method can be further performed with the projected data. The avoidance trajectory is thus calculated using the projected velocity and position. In various embodiments, the craft may be an air craft, a submarine craft, a space craft, a ship and/or a vehicle for driving on land.

The present method does not depend on the method according to which a trajectory heading towards the original target is adopted after an avoidance maneuver which is thus not discussed in more detail.

The present method for automatically avoiding collisions requires, for highly reliably avoiding collisions, outstandingly low overall spatial safety margins due to the good matching between the calculated trajectory and the actually adopted trajectory. Due to the simple calculation sequences very low temporal safety margins are required even at low hardware expenditures. The method can be adapted for the application in different crafts with very low efforts. Besides the adaptation to the respective actuators, it is only important for an optimal function that the correct function is provided for the avoidance trajectory radius k, whose upper limit has to be guaranteed, the function depending on the actual velocity and varies among different types of crafts.

It is to be noted that the present method yields clear requirements for the necessary sensor range, if the own velocity and the maximum possible velocity of the non-stationary obstacles are known, or, respectively, for the maximum allow-able own velocity, if the sensor range is given and the maximum velocity of potential obstacles can be assumed as known.

In the following, again, exemplary aspects of the system described herein are summarized. However, to following enumeration is neither complete nor all-embracing.

One example of the invention relates to a method for controlling a controllable, movable object for the purpose of avoiding collisions of the object with non-stationary obstacles. Thereby, a safety zone is assumed around non-stationary obstacles, in which the movable object shall not intrude, and an avoidance trajectory is calculated by means of a control logic, for the movable object so as to by-pass the obstacle in the case of the existence of a non-stationary obstacle having, or at least its safety zone having, a collision course. Further, the calculated avoidance trajectory, having the form of a circular arc, is thereby tangentially linked to the trajectory of the movable object before starting the avoidance maneuver, and the movable object is, by interaction of a control logic with actuators of the movable object, automatically made to adopt an actual avoidance trajectory that is at least approximating the calculated avoidance trajectory, whereby the calculated avoidance trajectory is tangent to the margin of the safety zone around the obstacle which moves together with the obstacle and is not to be passed through.

The calculated avoidance trajectory can include a straight segment tangentially linked to the end of the circular arc, and the track speed of the calculated compensation action can be assumed to be constant. The safety zone around the object can be assumed to be circle shaped.

In one example of the method in accordance with the invention a first curve is calculated for the calculation of the avoidance trajectory by vectorially subtracting, beginning at the position of the movable object, the simultaneous motion of the obstacle from the motion of the movable object along a circular arc, and by calculating a second curve which equals the margin of the safety zone around the obstacle at the time of the start of the avoidance maneuver, and further by calculating the first point on the first curve which has a common tangent with a point of the second curve.

In a further example of the method in accordance with the invention it is, in a first step, assumed for the calculation of an avoidance trajectory of the movable object under the assumption of tangency with the safety zone around the obstacle, that the safety zone stands still at the time of tangency with the avoidance trajectory. In a second step, a straight line is assumed which results from the extension of that vector which is formed by subtraction of the velocity vector of the obstacle from the velocity vector of the movable object at the time of said assumed tangency. In a third step it is calculated, to which extent the straight line calculated in the second step intrudes, as chord, into the circular safety zone around the obstacle which is assumed to stand still at the time of tangency with the trajectory; and in a fourth step the calculation of the first step is repeated, whereby the safety zone assumed to stand still is, compared to the first step, assumed to be augmented by a strip whose width equals the value calculated in the third step.

Further, for trajectories of obstacles, which approach from above or below the movable object, the projection into the plane of motion of the movable object can be considered and avoidance is performed for the projection in accordance with the described method.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for controlling an avoidance maneuver of an object for the avoidance of collisions with obstacles, the method comprising:
    detecting at least one non-stationary or stationary obstacle;
    defining a safety zone around the obstacle, wherein, when the obstacle is non-stationary, the safety zone moves together with the obstacle;
    detecting whether the obstacle, including the safety zone, is in a collision course with the object;
    calculating an avoidance trajectory, wherein the avoidance trajectory bypasses the obstacle, wherein the avoidance trajectory is at least approximately circularly shaped, and wherein the avoidance trajectory is tangent to the safety zone around the obstacle;
    performing the avoidance maneuver by steering the object, such that the object follows, at least approximately, the calculated avoidance trajectory, wherein the calculated avoidance trajectory is tangentially linked to a previous trajectory of the object,
    wherein, when the obstacle is non-stationary, calculating the avoidance trajectory includes:
    (A) calculating a tangential contact with the safety zone around the obstacle assuming that the safety zone stands still exactly at a time of tangency with the avoidance trajectory;
    (B) calculating a straight line which results from an extension of a vector which is formed by a subtraction of a velocity vector of the obstacle from a velocity vector of the object at the time of said assumed tangency;
    (C) calculating a length by which the straight line calculated in step B intrudes, as a chord, into the safety zone around the obstacle which is assumed to stand still at the time of tangency with the trajectory; and
    (D) repeating the calculation of the step A using an augmented safety zone, which is augmented by a circumferential strip having a width that equals the length as calculated in the step C.

2. The method of claim 1, further comprising:
    steering the object such that the object follows a course which runs, at least for a given time, straight and tangentially to the calculated avoidance trajectory as soon as the object reaches a point of tangency at the safety zone around the obstacle.

3. The method of claim 1, wherein, for the calculation of the avoidance trajectory, a velocity of the object is assumed to be constant.

4. The method of claim 1, wherein, when the obstacle is non-stationary, calculating the avoidance trajectory includes:
    calculating a first curve by:
        vectorially subtracting, starting from the position of the object at the beginning of the avoidance maneuver, simultaneous motion of the obstacle from a motion of the object along a circular arc;
    calculating a second curve being equal to a margin of the safety zone around the obstacle at the time of the start of the avoidance maneuver; and
    calculating a first point on the first curve that has a common tangent with a point on the second curve.

5. The method of claim 1, wherein the safety zone around the obstacle is circular.

6. The method of claim 1, wherein the step D includes:
    calculating an augmentation s of the radius of the safety zone by using the equation:

$$s = R_{Risk} \cdot \left(1 - \frac{\vec{V}_{it1} \cdot (\vec{V}_{it1} - \vec{V}_H)}{|\vec{V}_{it1}| \cdot |\vec{V}_{it1} - \vec{V}_H|}\right),$$

wherein $R_{Risk}$ corresponds to a radius of the safety zone around the obstacle, $V_{it1}$ corresponds to a velocity vector of the object directly after running through a circularly-shaped segment of the avoidance trajectory, and $V_H$ corresponds to a velocity vector of the obstacle.

7. The method of claim 1, further comprising:
    continuously surveilling an area neighbouring the object using an on-board sensor system for detecting and locating potential obstacles.

8. The method of claim 1, further comprising:
    calculating a projection of position and velocity of a detected obstacle into a plane of motion of the object;
    calculating the avoidance trajectory using the projected velocity and position.

9. The method of claim 1, wherein the object is an air craft.

10. The method of claim 1, wherein the object is a submarine craft.

11. The method of claim 1, wherein the object is a space craft.

12. The method of claim 1, wherein the object is a ship.

13. The method of claim 1, wherein the object is a vehicle for driving on land.

14. The method of claim 1, wherein the calculated avoidance trajectory is a segment of a circle having a radius (k), wherein the safety zone has a minimum radius ($R_{risk}$) and wherein a sensor radius ($R_{sense}$) is a minimum distance that satisfies at least one of:

(i) $R_{sense} \geq (k+R_{Risk}) \cdot \sin(a)$, wherein $a = \arccos(k/(k+R_{Risk}))$; or (ii) $R_{sense} \geq \sqrt{R_{Risk}^2 + 2 \cdot k \cdot R_{Risk}}$.

* * * * *